F. R. WILBER & H. E. BALL.
FISH BAIT.
APPLICATION FILED NOV. 4, 1916.

1,230,968.

Patented June 26, 1917.

Witnesses
H. Lowenstein.
John E. Jackson.

Inventor
Ford R. Wilber
Horace E. Ball
By D. R. Gourick
Attorney

UNITED STATES PATENT OFFICE.

FORD R. WILBER AND HORACE E. BALL, OF PAW PAW, MICHIGAN.

FISH-BAIT.

1,230,968.  Specification of Letters Patent.  Patented June 26, 1917.

Application filed November 4, 1916. Serial No. 129,472.

*To all whom it may concern:*

Be it known that we, FORD R. WILBER and HORACE E. BALL, citizens of the United States, residing at Paw Paw, in the county of Van Buren and State of Michigan, have invented certain new and useful Improvements in Fish-Baits, of which the following is a specification.

This invention relates to artificial fish baits and more particularly to that class of baits having hooks secured thereto, and has for one of its objects the provision of a bait of this class that will serve as a surface bait or an underwater bait at the will of the user.

A further object is to provide a bait of this class that will have a rolling or bobbing motion when in use similar to the letter S.

Another object is to provide a device of this character without auxiliary ballast.

A still further object is to provide a device of this character that will have the general appearance of a bug in the water, it being provided with flexible legs and enlarged staring eyes.

Figure 1:
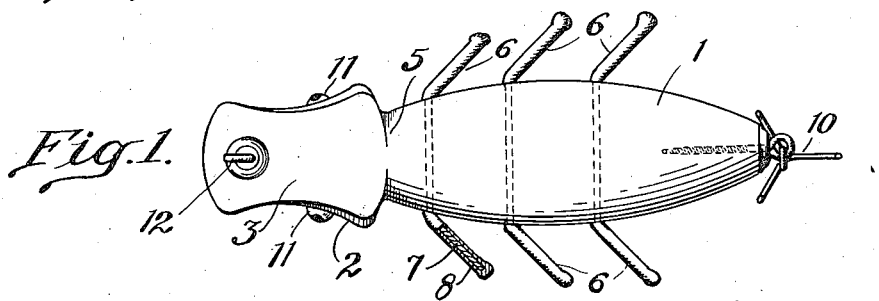
Figure 2:
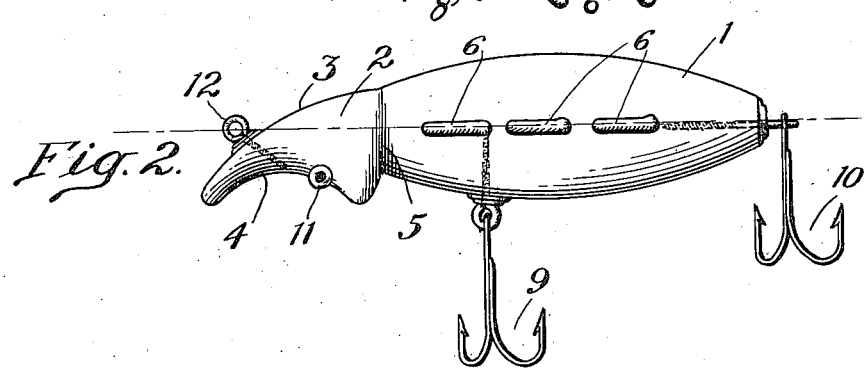
Figure 3:
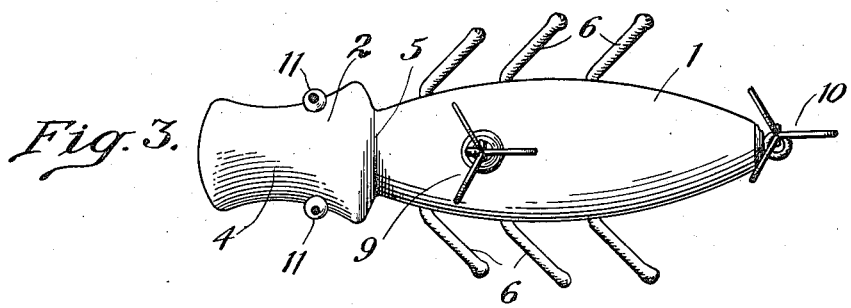
Figure 4:
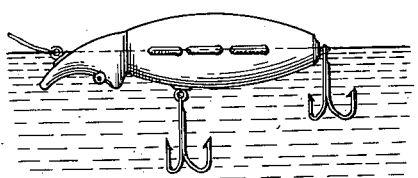
Figure 5:
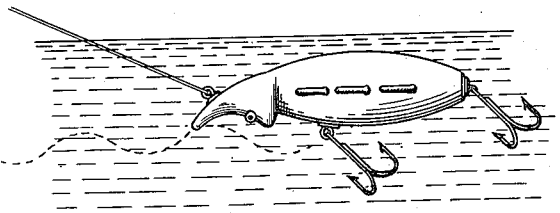

Other objects and advantages such as simplicity, durability, cheapness in manufacture and the general improvement of the art will be fully brought out in the following specification and illustrated in the accompanying drawings in which:

Figure 1 is a top plan view of our improved bait having one of the legs in section, Fig. 2 is a side view thereof, Fig. 3 is a bottom plan view, Fig. 4 is a view showing the bait floating as a surface bait, and Fig. 5 is a view showing our bait as an underwater bait and the course it takes when so used.

Referring more particularly to the drawings the numeral 1 designates the body portion of our bait. A head 2 is formed on the forward end of the bait and has its upper face or planate surface 3 rounded on a fifty degree circle more or less. The underside or face of the head 2 is cut away forming a throat 4 and then swells to the neck 5 of the body.

A plurality of flexible legs 6 comprising cores 7 made of twine or the like and covered by a water proof covering 8 are passed through the body and extend out from each side below the center of gravity.

A plurality or gang of hooks 9 is secured in the under side of the body portion and a second plurality or gang 10 of hooks is secured in the rear end of the body portion below the center of gravity.

Eyes 11 are secured in the head 2 below the center of gravity and serve to attract the fish.

A draft eye 12 is secured to the top face of the head and below the center of gravity.

The operation of the device is as follows: Assuming that the device is assembled a draft line is secured to the draft eye 12 and the bait is pulled through the water. When the bait is lying still or being retrieved slowly it will float as a surface bait but when retrieved rapidly it will be forced under the water as an underwater bait, the depth depending on the speed it is retrieved. When the bait is being retrieved the action of the water on the bait due to the peculiar construction of its head will cause it to have a rolling or bobbing motion similar to the letter S.

Having thus described our invention what we claim is:

1. A fish bait comprising a body portion, a head thereon, the upper surface of said head being planate and curved downward, a throat cut from the under side of said head, said head being enlarged to the rear of said throat forming a swelled portion, and said body portion being cut away forming a neck at its junction with said head.

2. A bait of the class described comprising a cigar shaped body portion, an enlarged head thereon, said head having its upper face planate and curved downwardly, a throat cut from the under side of said head, a swell formed on said head to the rear of said throat, and means for keeping said bait upright.

3. A fish bait comprising a body portion, a head thereon, the upper surface of said head being planate and curved downward, a throat cut from the under side of said head, said head being enlarged to the rear of said throat forming a swelled portion, said body portion being cut away forming a neck at its junction with said head, and leg members and hooks secured to said bait below its line of gravitation.

In testimony whereof we hereto affix our signatures.

FORD R. WILBER.
HORACE E. BALL.